(12) United States Patent
Nagata

(10) Patent No.: US 6,194,876 B1
(45) Date of Patent: Feb. 27, 2001

(54) POWER GENERATING SYSTEM

(75) Inventor: Yoichi Nagata, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/348,473

(22) Filed: Jul. 7, 1999

(30) Foreign Application Priority Data

Jul. 8, 1998 (JP) .................................................. 10-192582

(51) Int. Cl.[7] ...................................................... H02P 11/00
(52) U.S. Cl. ................................................. 322/5; 322/2 R
(58) Field of Search .................................. 322/2 R, 5, 99, 322/100; 361/21, 139; 323/220, 229

(56) References Cited

U.S. PATENT DOCUMENTS

| 3,656,045 | * | 4/1972 | Frezzolini et al. | ..................... 320/34 |
|---|---|---|---|---|
| 3,737,689 | * | 6/1973 | Schuerholz | ............................ 310/3 R |
| 4,129,893 | * | 12/1978 | Angello | .................................. 361/21 |
| 6,061,304 | * | 5/2000 | Nagata et al. | ......................... 368/66 |
| 6,069,846 | * | 5/2000 | Nagata | .................................. 368/64 |

* cited by examiner

*Primary Examiner*—Nicholas Ponomarenko
(74) *Attorney, Agent, or Firm*—Armstrong, Westerman, Hattori, McLeland & Naughton

(57) ABSTRACT

A switch means (3) consisting of plural switching elements, which switches the connection relationship, is provided between a pair of power generating terminals (g1, g2) of a power generator (10) and a pair of output terminals (e1, e2), to apply the output voltage to a load means (2) so as to utilize the generated power, at the same time voltage of the output terminals is measured with a switch-output measuring means (4), and a controller (5) controls the connection relationship between input and output terminals of the switch means (3) in response to the measured result to output the voltage having polarity required by the load means (2) from the output terminals (e1, e2) continually.

22 Claims, 7 Drawing Sheets

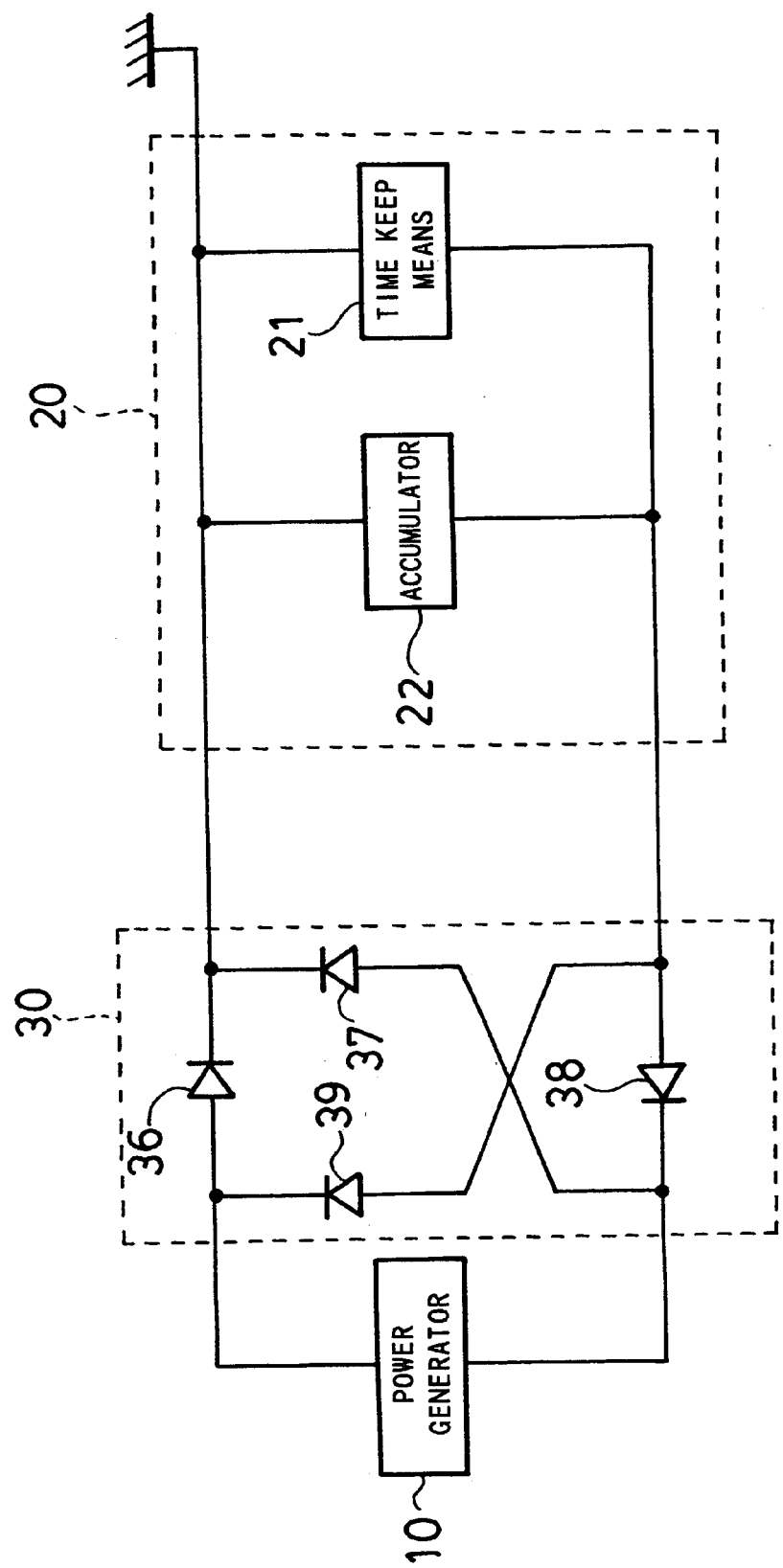

POWER GENERATING SYSTEM

BACKGROUND OF THE INVENTION

1. Field of the Invention

The present invention relates to a power generating system containing a power generator to generate power utilizing energy on the outside of the system, especially relating to a power generating system to drive load means (electronic equipment and the like) efficiently utilizing electric energy generated even when the polarity of generated voltage of the power generator is reversed according to the circumstances.

2. Description of the Related Art

There exits a power generating system which self-contains a power generator which converts outside energy such as light energy, thermal energy, or mechanical energy into electric energy, and is able to utilize the electric energy generated by the power generator for driving electronic equipment.

As such a power generating system, a solar battery system in which a solar battery is used as the power generator, a mechanical power generating system which is a means for utilizing mechanical energy of a rotating weight by converting into electric energy, or a power generating system by temperature difference which is a means for generating power with thermal energy caused by a temperature difference on both sides of a plurality of thermocouples connected in series, can be cited.

Particularly, as an example of the conventional power generating systems of those described above, there exists a power generating (thermoelectric) system by temperature difference which applies to an electronic timepiece, which is typically a compact portable electronic equipment, as shown in FIG. 7.

In the electronic timepiece of this thermoelectric system, a power generator 10 is connected to a load means 20 which consists of an accumulator 22 and a timekeeping means 21 through a switch means 30, and is configured to be able to utilize the generated power from the power generator 10 in the load means 20. That is, in this example, a current generated by the generated voltage of the power generator 10 is rectified by the switch means 30, and the rectified current is outputted to the accumulator 22 and the timekeeping means 21 to charge the accumulator 22 and to drive the timekeeping means 21.

The power generator 10 consists of plural thermocouples (not shown) connected in series. The power generator 10, for example this thermoelectric system, used to drive the electronic timepiece, is arranged in a manner that a warm junction side is contacted with a case back of the timepiece while a cold junction side is contacted with a case which is thermally insulated from the case back. Through this arrangement, thermal energy created by a temperature difference between the case cooled by outside air and the case back heated while the timepiece is worn by bodily temperature, is converted into electric energy to generate power, and the load means including the timekeeping means is driven by the generated electric power.

The load means 20 is configured to connect in parallel the timekeeping means 21, which has a time-keep function, with the accumulator 22 that is a second battery. The timekeeping means 21 grounds its positive pole terminal and connects its negative pole terminal to the switch means 30 as a negative pole of the load means 20.

The switch means 30 consists of first to fourth diodes 36 to 39, and connects these diodes in a bridge-shape so as to form a so-called full-wave rectifier. That is, one end of the power generator 10 connects to an anode of the first diode 36 and a cathode of the fourth diode 39, and the other end of the power generator 10 connects to an anode of the second diode 37 and a cathode of the third diode 38.

An anode of the third diode 38 and an anode of the fourth diode 39 are connected to a negative pole of the load means 20, and a cathode of the first diode 36 and a cathode of the second diode 37 are grounded.

The power generator which consists of a thermocouple (thermoelement) in this sort of the thermoelectric system, has a property in which the polarity of the generated voltage is changed by a direction of the temperature difference given from the outside of the thermoelectric system. Accordingly, in the power generator in the thermoelectric system, the polarity of the generated voltage reverses in accordance with a change of circumstances.

For instance, when the above-described electronic timepiece is a wrist watch which is attached to an arm, usually the temperature on the case back side which is closely contacted with the arm is higher than that on the case side which is exposed to the outside air, however, when the wrist watch is used in direct sunlight in the middle of summer, in a high temperature working circumstance, or in a torrid zone, it may happen that the case side is higher in temperature than the case back side. As a result, the polarity of the generated voltage created by the power generator 10 is sometimes reversed.

The switch means 30 in FIG. 7 is provided to make effective use of the generated power even when the polarity of the generated voltage created by the power generator 10 is reversed as described above.

However, in order to obtain generated voltage of about 1.0V required to operate the electronic timepiece from the power generator 10 by means of a slight temperature difference created in the inside of a timepiece, more than two thousand thermocouples are required to be connected to the power generator 10 in series. When such a power generator is attempted to be constructed in a limited space like a timepiece, the internal resistance of the thermocouples becomes at least of the magnitude of several tens of K $\Omega$. Accordingly, even when a bridge rectifier circuit of the switch means 30 as shown in FIG. 7 is configured with the Schottky barrier diode and the like, current is difficult to generate, and the electric power which can be taken out to the load means 20 side is only 40% as much as the amount of power originally expected. This brings a disadvantage that the utilization efficiency is very poor.

SUMMARY OF THE INVENTION

It is an object of the present invention to improve the above-described disadvantage and to facilitate effective utilization of the generated power consistently even in a power generating system using a power generator having the property to reverse the polarity of the generated voltage.

In order to achieve the above-described object, the power generating system according to the present invention comprises: a power generator outputting generated voltage by converting outside energy into electric energy; a switch means consisting of a plurality of switching elements, and being provided with a pair of output terminals respectively connectable to a pair of power generating terminals outputting generated voltage of the power generator; a switch-output measuring means which measures output voltage of the switch means; a load means which is connected to a pair of the output terminals of the switch means, and being applied with the output voltage of the switch means to operate by the electric power thereof; and a controller which controls the plurality of switching elements of the above-described switch means in response to the measured result of the switch-output measuring means, thereby controlling the connection relationship between the pair of power generating terminals of the power generator and the pair of output terminals of the switch means.

It can be a power generating system which comprises a power generator outputting generated voltage by converting outside energy into electric energy, a generated voltage measuring means for measuring the generated voltage of the power generator, a switch means consisting of a plurality of switching elements, and being provided with a pair of output terminals respectively connectable to a pair of power generating terminals outputting generated voltage of the power generator; a switch-output measuring means, which measures output voltage of the switch means; a load means which is connected to a pair of the output terminals of the switch means, and being applied with the output voltage of the switch means to operate by the electric power thereof; and a controller which controls the plurality of switching elements of the above-described switch means in response to the measured result of the generated voltage measuring means and the switch-output measuring means, thereby controlling the connection relationship between the pair of power generating terminals of the power generator and the pair of output terminals of the switch means. In the above-described power generating system, it is preferable that the switch-output measuring means described above performs the measuring operation intermittently at a predetermined period of time.

Furthermore, it is desired that the above-described controller includes a means to control the above-described switch means to isolate the power generator from the load means or to make the load means in a low load condition during the measuring operation of the switch-output measuring means, and it is also preferable to include a means to control the above-described switch means so as to separate the power generator from the load means or to make the load means in a low load condition during the measuring operation of the generated voltage measuring means.

The load means may include a means to control the switch means so as to short circuit between a pair of power generating terminals of the power generator when said load means does not require power supply by the power generator.

Additionally, when the controller is in an operation-stop state and when the power generator starts power generation from the operation-stop state, it is preferable to include an initializing means to apply the generated voltage of the above-described power generator to the controller without using the above-described load means.

It is also possible to provide a short-circuit means to short-circuit a voltage component in the reverse direction of the voltage supplying direction to the load means between a pair of the output terminals of the above-described switch means.

When the output voltage of the switch means is below a predetermined value, the above-described controller can be a means for controlling the connection relationship between a pair of power generating terminals of the above-described power generator and a pair of output terminals of the above-described switch means so that the switch means applies the generated voltage of the power generator reversing the polarity to the load means.

Furthermore, the above-described controller is preferably provided with a means for controlling the switch means so as to equalize one of a pair of the power generating terminals of the power generator to the ground potential of the switch-output measuring means and to connect the other power generating terminal to an input terminal of the switch-output measuring means, during the measuring operation of the switch-output measuring means.

Further again, the above-described controller is preferably provided with a means for controlling so as to change a period of the measuring operations of the switch-output measuring means according to the measured result of the switch-output measuring means.

The controller may be a means to control the switch means so as to reverse the connection relationship between a pair of the power generating terminals of the power generator and a pair of the output terminals of the switch means according to whether the generated voltage of the power generator measured by the generated voltage measuring means is more than a predetermined value or less than the predetermined value.

In addition, the above-described controller includes a means for controlling the switch means so that one of said pair of the power generating terminals of the power generator is equalized with the ground potential of the generated voltage measuring means, and the generated voltage measuring means measures the voltage of the other power generating terminal during the measuring operation of the generated voltage measuring means.

Further, it is desired that the above-described controller includes a means for controlling the switch means to isolate the power generator from the load means, when the output voltage of the switch means measured by the switch-output measuring means is less than a predetermined value.

Through the configuration described above, even in a power generating system having a power generator in which the polarity of the generated voltage changes in the forward direction or in the reverse direction according to the conditions of the outside energy, for instance, as in a thermoelectric power generating device, voltage is always outputted with a polarity suitable for the requirement of the load means on the output terminal of the switch means, regardless of the polarity of the generated voltage, by measuring a change in the generated voltage, and by controlling the connection relationship between a pair of the power generating terminals of the power generator and a pair of the output terminals of the switch means in response to the measured result. Accordingly, the generated power by the power generator can always be efficiently utilized by the load means.

As a result, according to the present invention, the generated voltage with a reversed polarity which could not be efficiently utilized conventionally can be utilized, and a power generating system which can utilize generated voltage in both directions with high efficiency can be realized.

The above and other objects, features and advantages of the invention will be apparent from the following detailed description which is to be read in conjunction with the accompanying drawings.

BRIEF DESCRIPTION OF THE DRAWINGS

FIG. 7 is a block circuit diagram showing a configuration of an electronic timepiece, which is an example of the conventional power generating system.

DETAILED DESCRIPTION OF THE PREFERRED EMBODIMENTS

Figure 1:
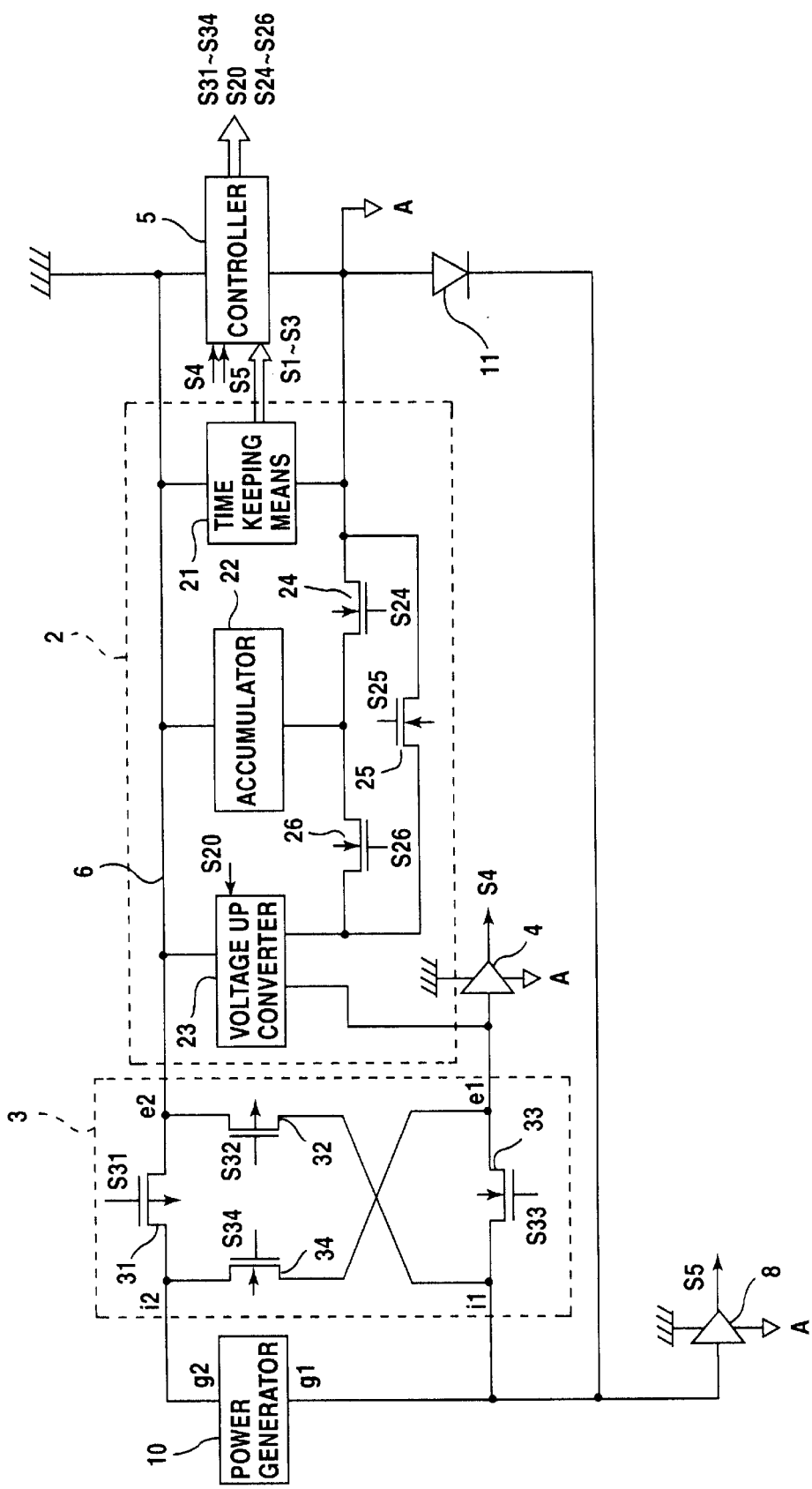
FIG. 1 is a block circuit diagram showing a system configuration of an electronic timepiece which is a first embodiment of the power generating system according to the present invention.
Figure 2:
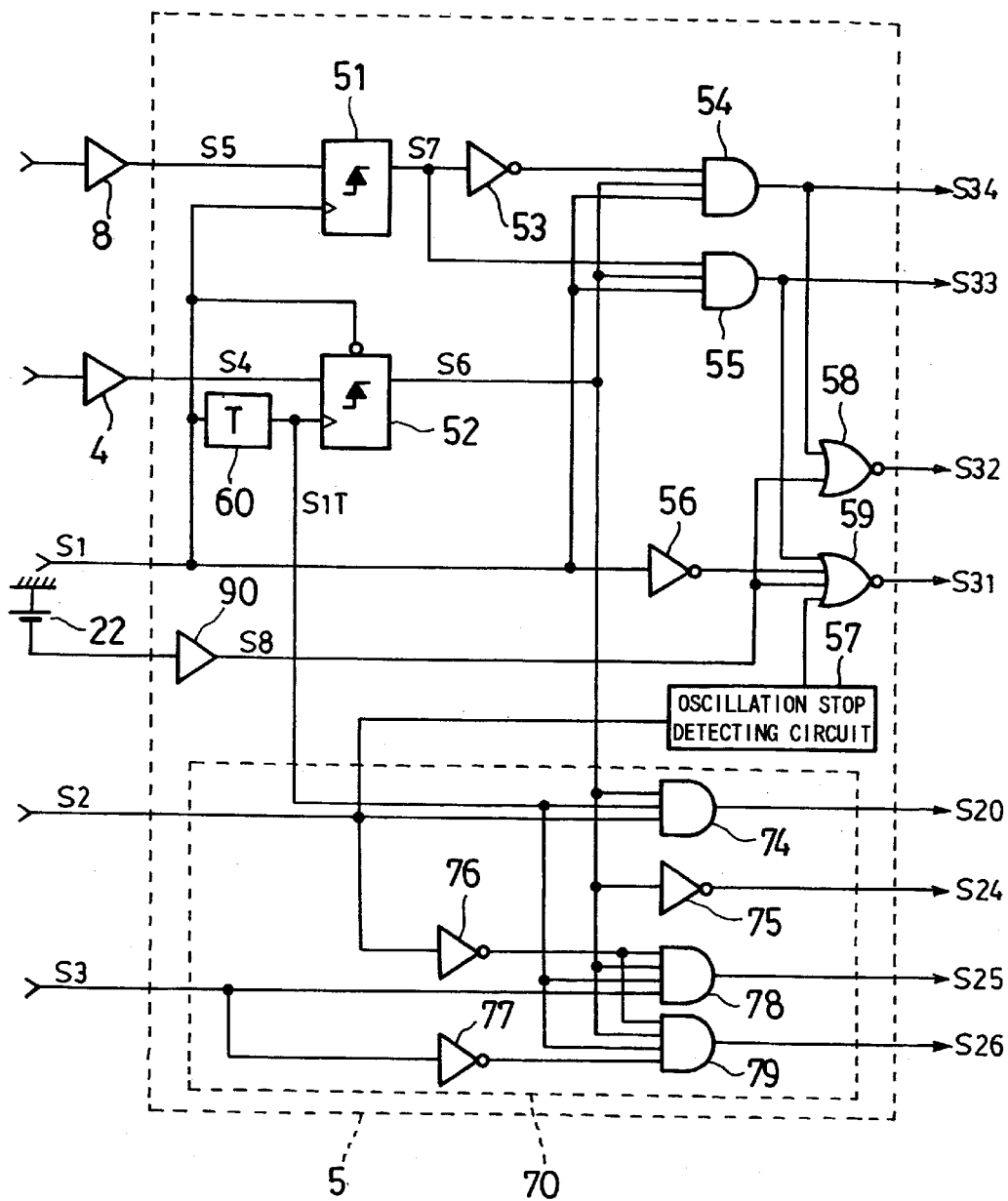
FIG. 2 is a circuit diagram showing a detailed circuit configuration of the controller in FIG. 1.
Figure 3:
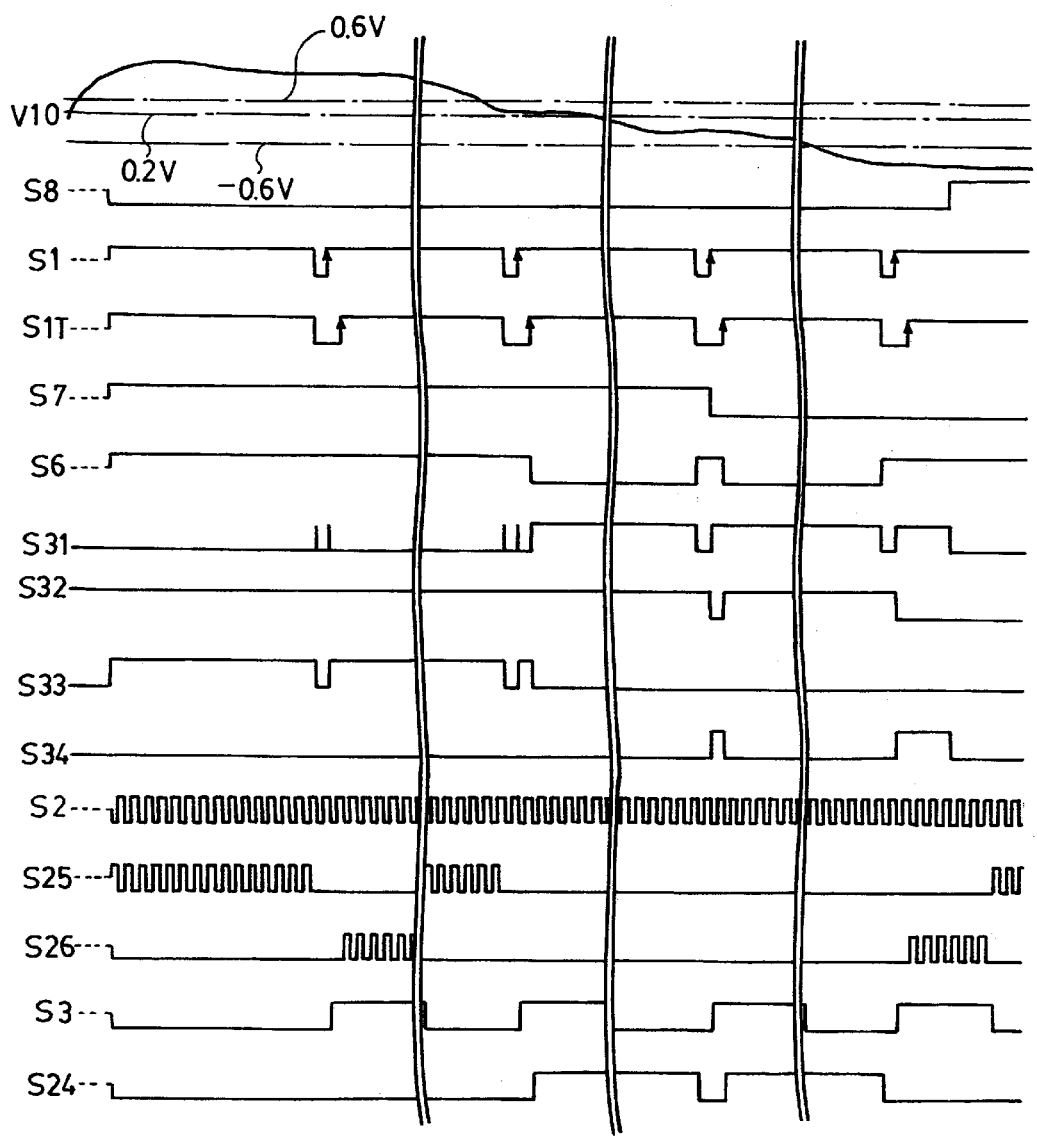
FIG. 3 is a timing chart showing waveforms of voltage and signal of each part to explain the operation of the electronic timepiece in FIG. 1.

Embodiments of the electronic timepiece to perform the power generating system according the present invention will be explained with reference to drawings hereinafter.
First Embodiment: FIG. 1 to FIG. 3

FIG. 1 is a block circuit diagram showing a configuration of the electronic timepiece which is the first embodiment of the power generating system according to the present invention. FIG. 2 is a circuit diagram showing in detail an example circuit of the controller, and FIG. 3 is a timing chart showing waveforms of voltage and signals in the principal portions of the electronic timepiece.

First, a system configuration of the electronic timepiece will be explained with reference to FIG. 1. The electronic timepiece shown in FIG. 1 is an electronic timepiece driven by electric power, which the power generator generates, similar to the conventional example shown in FIG. 7.

In the electronic timepiece, a load means 2 is connected to a power generator 10 through a switch means 3, and a controller 5 to control the switch means 3 and the load means 2 is connected to the power generator 10. A generated voltage measuring means 8 and a cathode of a diode 11 are connected to one of the power generating terminals g1 of the power generator 10, an anode of the diode 11 is connected to the negative-pole terminal of the controller 5, and a switch-output measuring means 4 is connected to one of the output terminals e1 of the switch means 3.

The power generator 10 (not shown) is a thermoelectric power generating device which consists of many thermocouples connected in series as a power generating element which converts thermal energy existing in the outside into electric energy, and performs power generation by being given a temperature difference between the warm junction side and the cold junction side. It is assumed that, when a temperature difference between the warm junction side and the cold junction side is, for instance, 1° C., generated voltage of about 0.8V is to be generated between a pair of power generating terminals g1 and g2.

The power generator 10 is disposed in the inside of a wrist watch which is an electronic timepiece, in a manner that the warm junction side is contacted with a case back, and the cold junction side is contacted with the inner face of the case which is heat-insulated from the case back. When the electronic timepiece is worn on a user's arm, due to the temperature difference between the case back side contacting the arm and the case side being exposed to the outside air, a temperature difference is created between both junctions of the power generator 10 and the power generator 10 is able to perform power generation by thermal energy of the temperature difference.

In such an electronic timepiece, since the case back side attached on the arm is warmed by bodily temperature, the temperature on the case back side is usually higher than that on the case side which is cooled by the outside air, thereby the power generator 10 generates generated voltage with a polarity corresponding to the direction of the temperature difference.

However, as explained hereinbefore, it may happen that the warm junction side is cooled and the cold junction side is warmed depending on the circumstances surrounding the electronic timepiece. When the direction of the temperature difference is thus reversed, naturally, generated voltage having a polarity in the reverse direction is generated as is the characteristic of a thermocouple constituting the power generator 10.

Then, for convenience' sake, in the condition where the electronic timepiece is usually used, the direction of voltage generated by the power generator is taken to be the forward direction, and the side to be warmed is called a warm junction and the side to be cooled is called a cold junction. Further, at that time, a terminal which shows a higher potential is taken as a positive pole terminal, and a terminal which shows a lower potential is taken as a negative pole terminal. And in the power generator 10 shown in FIG. 1, the power generating terminal g1 is a negative pole terminal and the power generating terminal g2 is a positive pole terminal. Usually, the positive pole terminal g2 is connected to an earth line 6, and negative voltage is to be applied to the load means 2 and the controller 5.

The switch means 3 has a pair of input terminals i1 and i2 always connected to a pair of the power generating terminals g1 and g2 of the power generator 10, a pair of the output terminals e1 and e2 being able to selectively connect respectively to the power generating terminals g1 and g2, and the output voltage of the output terminals e1 and e2 is applied to the load means 2, to operate the load means 2 with the power.

Further, four switches 31 to 34 composed of MOS field-effect transistors (FET) each of which is a switching element are connected between the input terminals i1, i2 and the output terminals e1, e2 of the switch means 3.

That is, the first switch 31 is connected between the input terminal i2 and the output terminal e2, the second switch 32 is connected between the input terminal i1 and the output terminal e2, the third switch 33 is connected between the input terminal i1 and the output terminal e1, and the fourth switch 34 is connected between the input terminal i2 and the output terminal e1, respectively. The operation of the switch means 3 will be explained later.

The load means 2 comprises a timekeeping means 21 having a time-clock function, an accumulator 22 which consists of a second battery such as lithium ions and the like, and a voltage-up converter 23, a discharge switch 24, a first distributing switch 25, and a second distributing switch 26 which consists of FETs which are respectively switching elements.

The timekeeping means 21 (not shown) comprises a time-keep circuit which divides an oscillation frequency of a crystal oscillator at least into a frequency of two seconds a cycle in the same way as an ordinary electronic timepiece, and deforms the divided signal to a driving signal of waveform necessary to drive a stepping motor, a stepping motor which is driven by the driving signal of time-keep circuit, and a time-displaying system which transmits the rotation of the stepping motor while reducing the rotation with a train wheel, and drives rotationally time displaying hands.

Though the above described time-display system is for an analog display type electronic timepiece, a digital display type electronic timepiece can be provided in the time-keep circuit with a circuit to form a numerical time display signal by decoding the dividing signal, instead of a circuit to form a driving signal having a waveform required for driving the stepping motor, and with a time-displaying system comprises a liquid crystal display device displaying time in digits by the numerical display signal, and its driving circuit.

The timekeeping means 21 generates a measuring clock S1, a voltage-up clock S2, and a distributing clock S3, and inputs all of those generated clock signals together into a controller 5 which will be explained later.

The measuring clock S1 is a waveform, which is in a low level for 8 milliseconds (m sec) and has a period of 2 seconds (sec). The voltage-up clock S2 is a rectangular wave having a frequency of 4 KHz and the distributing clock S3 is a rectangular wave having a frequency of 8 Hz. Since wave formation of the measuring clock S1, the voltage-up clock S2 and the distributing clock S3 is possible with a simple waveform synthesis of the divided signals of the oscillation signal from the crystal oscillator, a detailed explanation of the waveforming circuit will be omitted.

The voltage-up converter 23 is formed of the voltage-up circuit which switches the connection of two capacitors back and forth between series and parallel to raise the inputted voltage to double. Two capacitors are connected in parallel to be charged with the inputted voltage, then switched into a series connection to output voltage formed by adding the charged voltage of the two capacitors. The voltage-up converter 23 is configured in a manner that the on-off of the switching element which switches the connection state of the above-described two capacitors is controlled by a voltage-up signal S20 which is obtained by processing the voltage-up clock S2 with the controller 5 which will be explained later to perform the voltage-up operation. Incidentally, a detailed explanation of the configuration of the voltage-up converter 23 will be omitted.

A negative input terminal of the voltage-up converter 23 connects to an output terminal e1 of the switch means 3, and a negative output terminal of the voltage-up converter 23 is connected with a negative pole terminal of the accumulator 22 through the second distributing switch 26, and connected with a negative pole terminal of the timekeeping means 21 through the first distributing switch 25. Note that each positive pole terminal of the voltage-up converter 23, the accumulator 22 and the timekeeping means 21 is connected to the earth line 6 to be grounded.

The discharge switch 24, the first distributing switch 25 and the second distributing switch 26 are all made of n-channel FET and are connected to operate charge and discharge between each timekeeping means 21, the accumulator 22 and the voltage-up converter 23. That is, the discharge switch 24 is connected between the negative pole terminal of the timekeeping means 21 and the negative pole terminal of the accumulator 22, the first distributing switch 25 is connected between the negative pole terminal of the timekeeping means 21 and the negative output terminal of the voltage-up converter 23, and the second distributing switch 26 is connected between the negative pole terminal of the accumulator 22 and the negative output terminal of the voltage-up converter 23.

The discharge switch 24 is switched on when the power generator 10 does not perform power generation to make it possible to drive the timekeeping means 21 by the power accumulated in the accumulator 22. Either one of the first distributing switch 25 or the second distributing switch 26 applies the voltage-up output of the voltage-up converter 23 to either one of the timekeeping means 21 or the accumulator 22 by being turned on in synchronization with the voltage-up operation of the voltage-up converter 23, when the power generator 10 performs power generation.

The on-off control of the discharge switch 24, the first distributing switch 25 and the second distributing switch 26 is performed by applying each of the discharge signal S24, the first distributing signal S25 and the second distributing signal S26 to the gate terminals of each switch 24, 25 and 26 by the controller 5.

The controller 5 is connected to the timekeeping means 21 in parallel. The controller 5 is operatable when the timekeeping means 21 is in operation. The controller 5 inputs the measuring clock S1, the voltage-up clock S5 and the distributing clock S3 from the timekeeping means 21, and inputs each of the switch output measuring signal S4 and the generated voltage measuring signal S5 from the switch-output measuring means 4 and the generated voltage measuring means 8.

The controller 5 outputs a first switch signal S31, the second switch signal S32, the third switch signal S33, and the fourth switch signal S34 to the switch means 3 as output, and outputs further the discharge signal S24, the first distributing signal S25, and the second distributing signal S26 to the load means 2. Incidentally, the configuration and operation of the controller 5 will be explained later in detail.

In the switch-output measuring means 4, a positive pole terminal and a negative pole terminal of the electric power source are connected to a positive pole terminal (ground) and a negative pole terminal of the controller 5 (symbols A in FIG. 1 show that they are mutually connected). The switch-output measuring means 4 is a comparison amplifying circuit which outputs a signal in a high level if the potential of the inputted voltage is not more than −0.6V, and outputs a signal in a low level if it is more than −0.6V (including positive potential).

The switch-output measuring means 4 inputs voltage of the output terminal e1 of the switch means 3, and allows the switch-output measuring signal S4, that is an output signal, to input to the controller 5.

In the generated voltage measuring means 8, a positive pole terminal and a negative pole terminal of the electric power source are connected to a positive pole terminal (ground) and a negative pole terminal of the controller 5, and the generated voltage measuring means 8 is a comparison amplifying circuit which outputs a signal in a high level if the potential of the inputted voltage is not more than −0.2V, and outputs a signal in a low level if it is more than −0.2V (including positive potential).

The generated voltage measuring means 8 inputs voltage of the power generating terminal g1 of the power generator 10, and allows the generated voltage measuring signal S5, that is an output signal, to input to the controller 5.

The controller 5 outputs the first to fourth switch signal from S3 1 to S34, to each gate from the first to fourth switch 31 to 34 selectively, according to the generated voltage measuring signal S5, that is a measured result of the generated voltage measuring means 8, and the switch output measuring signal S4, that is a measured result of the switch-output measuring means 4, and controls its on and off states.

The above-described configuration controls a connection relationship between the power generating terminals g1, g2 of the power generator 10 and the output terminal e1, e2 of the switch means 3.

The first and second switches 31 and 32 of the switch means 3 are p-channel FETs and the third and fourth switches 33 and 34 are n-channel FETs.

All of each circuit group of the switch means 3, the time-keep circuit of the timekeeping means 21 of the load means 2 and portions except the capacitor of the voltage-up converter, the controller 5, the diode 11, the switch-output measuring means 4, and the generated voltage measuring means 8 can be provided in the same integrated circuit, similarly to a typical electronic timepiece.

Next, a detailed example circuit and its operation of the aforementioned controller 5 will be explained with reference to FIG. 2.

The controller 5 shown in FIG. 2 comprises a first flip-flop circuit 51 and a second flip-flop circuit 52, a first inverter 53 and a second inverter 56, a first AND gate 54 and a second AND gate 55, an oscillation stop detecting circuit 57, a first NOR gate 58 and a second NOR gate 59, a multivibrator 60, a charge and discharge control circuit 70 and an excessive charge detecting circuit 90.

The first flip-flop circuit 51 is a data-type flip-flop circuit which keeps data input values and outputs at the leading edge transition of an input clock. A measuring clock S1 is inputted as an input clock, and a generated voltage measuring signal S5, that is an output signal of the generated voltage measuring means 8 is inputted as a data input to the first flip-flop circuit 51, and outputs an output signal S7.

The second flip-flop circuit 52 is a data-type flip-flop circuit with a set terminal, which keeps data input values and outputs at the leading edge transition of an input clock. A switch output measuring signal S4, that is an output of the switch-output measuring means 4 is inputted as a data input, and an output signal S1T of the multivibrator 60 is inputted as an input clock to the second flip-flop circuit 52. The set terminal is an active low and the measuring clock S1 from the timekeeping means 21 is inputted and the output signal S6 is outputted.

The first inverter 53 inputs an output signal S7 of the first flip-flop circuit 51 and outputs its inverted signal.

The first AND gate 54 is a three-input AND gate which inputs an output signal of the first inverter 53 (an inverted signal of the output signal S7 of the flip-flop circuit 51), the measuring clock S1 and the output signal S6 of the second flip-flop circuit 52, and outputs the AND signal of these values as a fourth switch signal S34.

Similarly, the second AND gate 55 is also a three-input AND gate and inputs an output signal S7 of the first flip-flop circuit 51, the measuring clock S1, and an output signal S6 of the second flip-flop circuit 52, and outputs the AND signal of these values as a third swich signal S33.

The second inverter 56 inputs the measuring clock S1 and outputs its inverted signal.

The oscillation stop detecting circuit 57 inputs the voltage-up clock S2 as an input signal and operates in accordance with a frequency of the voltage-up clock S2. That is, the oscillation stop detecting circuit 57 outputs a high level signal when the input signal does not oscillate, but once the input signal starts oscillating at more than a predetermined frequency, it outputs a low level signal. Incidentally, the configuration of the oscillation stop detecting circuit is a common one, a detailed explanation thereof will be omitted.

The first NOR gate 58 is a two-input NOR gate and inputs a fourth switch signal S34 and an excessive charge detecting signal S8 which will be explained later, and outputs an NOR signal as a second switch signal S32.

The second NOR gate 59 is a four-input NOR gate, and inputs an output signal of the oscillation stop detecting circuit 57, the excessive charge detecting signal S8, the third switch signal 33, and a reverse signal of the measuring clock S1, and outputs an NOR signal of these values as a first switch signal S31.

Particularly, for the second NOR gate 59 and the oscillation stop detecting circuit 57, the one which can output a predetermined signal just after power source is applied to the controller 5 is used, different from the other logic circuit portions.

The multivibrator 60 is a timer circuit which outputs a high level, regardless of the input waveforms, after a certain period of time from when the waveform falls into a low level. The period of time to keep in the low level is assumed to be set to 16 milliseconds (m sec). The multivibrator 60 inputs the measuring clock S1 and outputs an output signal S1T.

It should be noted that the flip-flop circuit used in this embodiment is assumed, for simplification, to be configured in such a manner that all holding data are set upon the time of supplying power source.

The excessive charge detecting means 90 is a comparison amplifying circuit which outputs a high level when voltage lower than −2.0V is inputted, and the input terminal is connected to a negative pole of the accumulator 22 to output the excessive charge detecting signal S8.

It should be noted that the diode 11 and the first switch 31 shown in FIG. 1 correspond to an initializing means together with the oscillation stop detecting circuit 57 and the second NOR gate 59, and serves as components to realize the initial starting operation in this embodiment.

The charge and discharge control circuit 70 comprises a third AND gate 74, a third inverter 75, a fourth inverter 76, a fifth inverter 77, a fourth AND gate 78, and a fifth AND gate 79.

The third AND gate 74 is a three-input AND gate, and outputs the AND signal of the output signal S6 of the second flip-flop circuit 52, the voltage-up clock S2 and the output signal S1T of the multivibrator 60 as a voltage-up signal S20.

The third inverter 75 inputs the output signal S6 of the second flip-flop circuit 52 and inverts it to output as a discharge signal S24. The fourth inverter 76 inputs the voltage-up clock S2 and outputs its inverted signal. The fifth inverter 77 inputs a distributing clock S3 and outputs its inverted signal.

The fourth AND gate 78 is a four-input AND gate, and inputs an inverted signal of the voltage-up clock S2, an output signal S6 of the second flip-flop circuit 52, the output signal S1T of the multivibrator 60, and the distributing clock S3, and outputs the AND signal of these values as a first distributing signal S25.

The fifth AND gate 79 is also a four-input AND gate that inputs an inverted signal of the voltage-up clock S2, an output signal S6 of the second flip-flop circuit 52, an output signal S1T of the multivibrator 60, and an inverted signal of the distributing clock S3, that is an output of the fifth inverter 77, and outputs the AND signal of these values as a second distributing signal S26.

The charge and discharge control circuit 70 is used in a second embodiment of the present invention in a similar manner, which will be explained later.

Next, an operation as a power generating system according to the above-described electronic timepiece with reference to FIG. 3 also.

FIG. 3 is a timing chart showing waveforms of voltage and signal of principal portions, starting with the generated voltage V10 of the power generator 10. The generated voltage V10 shows a voltage waveform of the potential difference generated between the power generating terminals g1 and g2 of the power generator 10, and to make the explanation easy, shows an open voltage under the condition where no voltage drop occurs by the load current.

In the following explanation, since there exists little electric power accumulated in the accumulator 22, the terminal voltage is about 0.6V, and the timekeeping means 21 which is a component of the load means 2 and the controller 5 are assumed to be in a state of suspension of the operation.

This electronic timepiece is configured so as to start the operation when the power generator 10 generates voltage of more than 1.0V in the forward direction from the state of suspension of the operation. Therefore, the starting of the operation will be explained first.

When the power generator 10 starts the power generation in the forward direction (negative polarity in the power generating terminal g1 side) from the above-described suspension state, the generated voltage is applied to the controller 5 through the diode 11 without passing through the load means 2.

At this time, the oscillation stop detecting circuit 57 of the controller 5 shown in FIG. 2 outputs a high level signal because the input signal does not oscillate. Accordingly, the second NOR gate 59 forcibly outputs a low level signal. Thereby the first switch signal S31 becomes the low level, so that the first switch 31 of the switch means 3 in FIG. 1 tends to be in an on state in an analog fashion even when the timekeeping means 21 stops the operation.

Accordingly, when the power generator 10 starts the power generation in the forward direction and generates the generated voltage of 1.0V, the diode 11 becomes in an on state, and the first switch 31 also soon changes to the on state. Then, as a result, the generated voltage of the power generator 10 is applied to the controller 5 and the timekeeping means 21, thereby the power is on to start a predetermined operation.

The timekeeping means 21 starts the time keeping operation as an electronic timepiece on starting of the operation, while starting to output the measuring clock S1, the voltage-up clock S2 and the distributing clock. The oscillation stop detecting circuit 57 which inputs the voltage-up clock S2 also starts outputting a low level signal with start of the oscillation. Incidentally, once the controller 5 starts the operation, the oscillation stop detecting circuit 57 does not exert an influence upon subsequent operation of the controller 5.

On the other hand, the output signal S7 of the first flip-flop circuit 51 and the output signal S6 of the second flip-flop circuit 52 are initialized in a high level just after the controller 5 starts operation.

Therefore, while the measuring clock S1 is in a high level, the first switch 31 and the third switch 33 of the switch means 3 in FIG. 1 become in an on state, and the second switch 32 and the fourth switch 34 become in an off state. Accordingly, the switch means 3 connects the power generating terminals g1 and g2 of the power generator 10 with the output terminals e1 and e2 of the switch means 3 in the forward direction respectively, and outputs the inputted generated voltage as it is.

Since the output signal S1T of the multivibrator 60 stays also in a high level till the measuring clock S1 gets the trailing edge transition, the third AND gate 74 which inputs the output signal S1T and the high level output signal S6 of the second flip-flop circuit 52 in FIG. 2, outputs the voltage-up clock S2 into the voltage-up converter 23 as a voltage-up signal S20 as it is, thereby the voltage-up converter 23 performs the voltage-up operation.

At this time, since the switch means 3 outputs the generated voltage of the power generator 10 as it is, the voltage-up converter 23 can raise the generated voltage for which the power generator 10 generates in the forward direction.

Further, while the distributing clock S3 stays in a high level, the first distributing signal S25 outputs an inverted signal of the voltage-up clock S2, and on the contrary, while the distributing clock S3 stays in a low level, the second distributing signal S26 which inputs an inverted signal of the distributing clock S3 outputs an inverted signal of the voltage-up clock S2.

Then, the first distributing switch 25 and the second distributing switch 26 of the load means 2 in FIG. 1 switch to the on and off state alternatively, so that the voltage-up output from the voltage-up converter 23 is applied to a timekeeping means 21 side and the accumulator 22 side alternatively, and the charging and the time keeping operation are performed simultaneously.

On the other hand, while the output signal S6 of the second flip-flop circuit 52 in FIG. 2 is in a high level, the discharge signal S24 which is inverted by the third inverter 75 becomes in a low level. As a result, the discharge switch 24 in the load means 2 in FIG. 1 is in an off state where the accumulator 22 is separated from the timekeeping means 21.

Though there is no direct relation to the above-described operations, it should be noted that since the accumulator 22 has accumulating voltage of about 0.6V, the excessive charge detecting means 90 makes the excessive charge detecting signal S8 in a low level.

Here, an operation of the controller 5 of the electronic timepiece to process the measured result of the generated voltage measuring means 8 and the switch-output measuring means 4 will be explained. The operation is performed when the measuring clock S1 from the timekeeping means 21 comes to a low level.

When the measuring clock S1 gets the trailing edge transition, the holding data is set to the second flip-flop circuit 52 of the controller 5 shown in FIG.2 and the output signal S6 comes to a high level, but the output signal S1T which is in a low level for a predetermined period is outputted from the multivibration 60. Consequently, the voltage-up signal S20 is kept in a low level for the predetermined period of time, and the voltage-up converter 23 stops the voltage-up operation.

Accordingly, the power generator 10 comes to a state similar to the open state separated from the load means 2, and a correct generated voltage in a no-load state is obtained between the power generating terminals g1 and g2 of the power generator 10.

The discharge signal S24 keeps a state in low level. Similarly, the first distributing signal S25 and the second distributing signal S26 come to a low level, and the three switches 24, 25, and 26 contained in the load means 23 are all in an off state.

Furthermore, the second switch 32, the third switch 33 and the fourth switch 34 of the switch means 3 are in an off state. But, since only the first switch 31 keeps in an on state, the power generating terminal g2 in the positive pole side among the power generating terminals g1 and g2 of the power generator 10 is connected to the earth line 6, and the potential of the power generating terminal g2 is equal to the ground potential of the generated voltage measuring means 8. Then, the measuring operation by the generated voltage measuring means 8 explained below is correctly performed, and the voltage of the power generating terminal g1 in the negative pole side of the power generator 10 is measured.

In a state where the power generator 10 generates voltage more than 1.0V in the forward direction, the input voltage of the generated voltage measuring means 8, that is voltage to the ground potential of the power generating terminal g1 in the negative pole side, has a voltage lower than 1.0V. Consequently, the generated voltage measuring means 8 outputs a high level signal as a generated voltage measuring signal S5 because the inputted voltage is found to be lower when compared with −0.2V, that is the internal threshold value.

Then, the measuring clock S1 rises in a high level, and the first flip-flop circuit 51 captures the generated voltage measuring signal S5 in a high level with an edge of the leading edge transition so as to make the output signal S7 in a high level again.

At this time, the power generator 10 generates voltage of more than 1.0V in the forward direction, and furthermore when the measuring clock S1 comes to a high level, the first switch 31 and the third switch 33 of the switch means 3 in FIG. 1 become in an on state and the second switch 32 and the fourth switch 34 become in an off state.

Accordingly, the potential of the power generating terminal g2 in the positive pole side of the power generator 10 becomes equal to the ground potential of the switch-output measuring means 4 while the power generating terminal g2 is kept connecting to the earth line 6, and at the same time the power generating terminal g1 (in the negative pole side) is connected to the output terminal e1 of the switch means 3, and the generated voltage of the power generator 10 is correctly inputted to the switch-output measuring means 4 in the forward direction. Accordingly, since the inputted voltage to the ground potential of the switch-output measuring means 4 becomes a voltage lower than −1.0V, the switch-output measuring means 4 outputs a high level signal as a switch output measuring signal S4, comparing between the input voltage and the internal threshold value of −0.6V, and finding that the inputs voltage is lower.

When 8 milliseconds (m sec) has passed after the leading edge transition of the measuring clock S1, the output signal S1T of the multivibrator 60 in FIG. 2 gets the leading edge transition. The second flip-flop circuit 52 captures the switch output measuring signal S4 in a high level with the leading edge transition to make the output signal S6 in a high level again.

Thus, when both the output signal S6 of the second flip-flop circuit 52 and the output signal S7 of the first flip-flop circuit 51 are in a high level, the controller 5 keeps the first switch 31 and the third switch 33 of the switch means 3 to be an on state and the second switch 32 and the fourth switch 34 to be an off state by the switch signals S31 to S34. Accordingly, the switch means 3 continues to output the generated voltage of the power generator 10 as it is.

Additionally, when the output signal S1T of the multivibrator 60 comes to a high level, the voltage-up signal S20, the first distributing signal S25 and the second distributing signal S26 become active, and the voltage-up converter 23 restarts the operation to raise the generated voltage applied from the output terminals e1 and e2 of the switch means 3, and performs charging to the accumulator 22 and power supply to the timekeeping means 21.

Next, the case where the generated voltage V10 of the power generator 10 lowers from about 1.0V and reaches near 0.4V in the forward direction, will be explained.

When the measuring clock S1 gets the trailing edge transition again followed from the above-described state, the first flip-flop circuit 51 and the second flip-flop circuit 52 start preparing for the capture of signals. That is, by respective signals from the controller 5, the voltage-up converter 23 suspends the voltage-up operation to make all three switches 24, 25 and 26 in the load means 2 in an off state. Only the first switch 31 in the switch means 3 continues to be in an on state.

Voltage of −0.4V of the power generating terminal g1 in the negative pole side of the power generator 10 to the ground potential is inputted to the generated voltage measuring means 8. Accordingly, since the input voltage is lower than −0.2V, that is the internal threshold value, the generated voltage measuring means 8 again outputs a high level signal as a generated voltage measuring signal S5.

When the measuring clock S1 gets the leading edge transition after 8 milliseconds (m sec), the first flip-flop circuit 51 captures the generated voltage measuring signal S5 in a high level, so that the output signal S7 is kept in a high level. Since the first switch signal S31 is in a low level, and the third switch signal S33 is in a high level, the first switch 31 and the third switch 33 of the switch means 3 become in an on state again, and apply the generated voltage of the power generator 10 to the load means 2 as it is (in the forward direction).

At this time, the generated voltage of the power generator 10 is applied correctly to the switch-output measuring means 4 in the forward direction, the applied voltage is −0.4V. Therefore, since the value is higher than the internal threshold value of −0.6V, the switch-output measuring means 4 outputs a switch output measuring signal S4 in a low level.

After another 8 milliseconds, when the output signal S1T of the multivibrator 60 gets the leading edge transition, the second flip-flop, circuit 52 captures the low level switch output measuring signal S4, thereby the output signal S6 is changed to be in a low level.

When the output signal S6 of the second flip-flop circuit 52 comes to a low level, the first switch signal S31 and the second switch signal S32 become a high level, and the third switch signal S33 and the fourth switch signal S34 come to a low level. Accordingly, the four switches 31 to 34 in the switch means 3 are all in an off state.

In addition, since all of the voltage-up signal S20, the first distributing signal S25 and the second distributing signal S26 come to a low level, the voltage-up converter 23 is in a state to stop the voltage-up operation. As a result, the first distributing switch 25 and the second distributing switch 26 in the load means 2 are all in an off state. However, because it is a reverse signal of the output signal S6 of the second flip-flop circuit 52, the discharge signal S24 gets in a high level, and the discharge switch 24 is turned on. Thus, it becomes possible to operate the timekeeping means 21 and the controller 5 continuously by electric power accumulated in the accumulator 22.

Next, the case where circumstances of the electronic timepiece changes and generated voltage of the power generator 10 becomes near 0.4V in the reverse direction from about 0.4V in the forward direction, will be explained.

In this circumstance, when the measuring clock S1 gets the trailing edge last transition again, the first flip-flop circuit 51 and the second flip-flop circuit 52 start preparing to capture signals. That is, the voltage-up converter 23 stops the voltage-up operation by each signal from the controller, and the three switches 24, 25 and 26 provided in the load means 2 are all in an off state.

In the switch means 3, since only the first switch 31 keeps the on state, +0.4 V, that is voltage to the ground potential of the power generating terminal g1 in the negative pole side of the power generator 10 is inputted to the generated voltage measuring means 8. Since the inputted voltage is higher than −0.2V, that is the internal threshold value of the generated voltage measuring means 8, the generated voltage measuring means 8 outputs a low level signal as a generated voltage measuring signal S5. The generated voltage measuring means 8 detects the inputted voltage as a ground potential when the inputted voltage is higher than the ground potential.

The measuring clock S1 gets the leading edge transition and 8 milliseconds after that, the first flip-flop circuit 51 captures the low level generated voltage measuring signal S5 to make the output signal S7 in a low level. As a result, the first switch signal S31 and the fourth switch signal S34 come to a high level, and the second switch signal S32 and the third switch signal S33 come to a low level, and in the switch means 3, the second switch 32 and the fourth switch 34 are in an on state, while the first switch 31 and the third switch 33 are in an off state.

Accordingly, the switch means 3 is controlled in such a manner that the connection relationship between a pair of the power generating terminals g1, g2 of the power generator 10 and a pair of the output terminals e1, e2 of the switch means 3 is reversed, that is, the power generating terminal g1 connects to the output terminal e2 and the power generating terminal g2 connects to the output terminal e1 respectively. Then, the switch means 3 outputs the generated voltage of the power generator 10 reversing its polarity and applies voltage to the load means 2 in the same normal polarity as before.

At this time, the generated voltage of the power generator 10 is applied to the switch-output measuring means 4 in the normal polarity. However, since the voltage to the ground potential is −0.4V, and is higher than −0.6V, that is the internal threshold value, the switch-output measuring means 4 outputs the switch output measuring signal S4 in a low level.

A further 8 milliseconds later, when the output signal S1T of the multivibrator 60 gets the leading edge transition, the second flip-flop circuit 52 captures the low level switch output measuring signal S4 and the output signal S6 keeps in a low level.

When the output signal S6 of the second flip-flop circuit 52 is in a low level, the first switch signal S31 and the second switch signal S32 come to a high level. And the third switch signal S33 and the fourth switch signal S34 come to a low level, and the four switches 31 to 34 of the switch means 3 are all in an off state again.

Furthermore, since the voltage-up signal S20, the first distributing signal S25, and the second distributing signal S26 are in low level, the voltage-up converter 23 is in a state to stop the voltage-up operation, and the first distributing switch 25 and the second distributing switch 26 are in an off state. However, the discharge signal S24 comes to a high level by being outputted as an inverted signal of the output signal S6 of the second flip-flop circuit 52, and the discharge switch 24 comes to an on state. Accordingly, it continuously operates the timekeeping means 21 and the controller 5 with the power accumulated in the accumulator 22.

Next, the case where the circumstances surrounding the electronic timepiece is further changed and the generated voltage of the power generator 10 comes near 1.0V in the reverse direction from the above-described state, will be explained.

At this time, the measuring clock S1 gets the trailing edge transition again, and the first flip-flop circuit 51 and the second flip-flop circuit 52 prepare to capture signals. That is, the voltage-up converter 23 stops the voltage-up operation, and the three switches 24, 25 and 26 in the load means 2 are all in an off state by each signal from the controller 5.

In addition, in the switch means 3, since only the first switch 31 keeps in an on state, voltage of +1.0V to the ground potential from the power generating terminal g1 in the negative pole side of the power generator 10 is inputted to the generated voltage measuring means 8. Accordingly, the generated voltage measuring means 8, the inputted voltage being higher than −0.2V, that is the internal threshold value, outputs the generated voltage measuring signal S5 in a low level.

When the measuring clock S1 gets the leading edge transition after 8 milliseconds, the first flip-flop circuit 51 captures the generated voltage measuring signal S5 in a low level to make the output signal S7 in a low level. Thus, in the switch means 3, the second switch 32 and the fourth switch 34 come to an on state, and the first switch 31 and the third switch 33 are in an off state. As a result, the switch means 3 outputs the generated voltage of the power generator reversing the polarity to apply voltage in a normal polarity to the load means 2.

Accordingly, the generated voltage of the power generator 10 is inputted to the switch-output measuring means 4 with reverse polarity, and since the voltage to the ground potential is −1.0V, which means that it is lower than the internal threshold value of −0.6V, it outputs the switch output measuring signal S4 in a high level.

When the output signal S1T of the multivibrator 60 gets the leading edge transition further after 8 milliseconds, the second flip-flop circuit 52 captures the high level switch output measuring signal S4 to keep the output signal S6 in a high level.

When the output signal S6 of the second flip-flop circuit 52 is in a high level, the first switch signal S31 and the fourth switch signal S34 come to a high level, and the second switch signal S32 and the third switch signal S33 are in a low level. As a result, in the switch means 3, only the second switch 32 and the fourth switch 34 are in an on state, and the switch means 3 keeps in the aforementioned reverse connection state.

The voltage-up signal S20, the first distributing signal S25 and the second distributing signal S26 become active, and the voltage-up converter 23 performs the voltage-up operation, and charges the accumulator 22 with the raised voltage or applies it to the timekeeping means 21 and the controller 5. But the discharge signal 24 which is an inverted signal of the output signal S6 of the second flip-flop circuit 52, comes to a low level, which makes the discharge switch 24 in an off state, and the power accumulated in the accumulator 22 can not be discharged.

Next, the case where the accumulator 22 comes to an overcharged state by the progress of the charge to the accumulator 22 will be explained.

Processed as above, while the generated voltage of the power generator 10 is raised to charge the accumulator 22, the voltage between terminals of the accumulater 22 is soon increased to reach a state exceeding 2.0V. In this state, since voltage of the negative pole terminal to the ground potential of the accumulator 22 is lower than −2.0V, the excessive charge detecting means 90 connecting to the negative pole terminal of the accumulator 22 inputs the voltage to make the excessive charge detecting signal S8 which has been in a low level, in a high level as shown in FIG. 2.

When the excessive charge detecting signal S8 comes to a high level, the first NOR gate 58 and the second NOR gate 59 output a low level signal regardless of the other input signals. That is, since the first switch signal S31 and the second switch signal S32 become in a low level, both the first switch 31 and the second switch 32 in the switch means 3 come to an on state. Therefore, the pair of power generating terminals g1 and g2 of the power generator 10 are short-circuited with the first switch 31 and the second switch 32.

After that, since when the second flip-flop circuit 52 captures the switch output measuring signal S4, the input voltage of the switch-output measuring means 4 is nearly 0V, the switch output measuring signal S4 comes to a low level, and as a matter of course, when the second flip-flop circuit 52 captures it, the output signal S6 comes to a low level.

Accordingly, the voltage-up signal S20 comes to a low level to stop the voltage-up operation of the voltage-up converter 23. Accordingly, charging of the accumulator 22 is also stopped, excessive charge of the accumulator 22 can be prevented.

Now, it is clear from the above explanation of the operations, once sufficient generated voltage can be obtained from the power generator 10 in this electronic timepiece, the load means 2 can be started correctly even from a state when all operations are stopped.

When the generated voltage is in the forward direction, the switch means 3 is made in a connection state in the forward direction, and when the generated voltage is in the reverse direction, or very low in the forward direction, the controller 5 controls each switch 31 to 34 so as to switch the connection relationship of power generating terminals g1, g2 of the power generator 10 and the output terminals e1, e2 of the switch means 3.

Then, the generated voltage of the power generator 10 is always kept in a predetermined polarity by the switch means 3, and the voltage-up converter 23 is allowed to operate only while the voltage is in an applicable level by the load means 2, and the generated power is made applicable to drive the load means 2.

Figure 4:
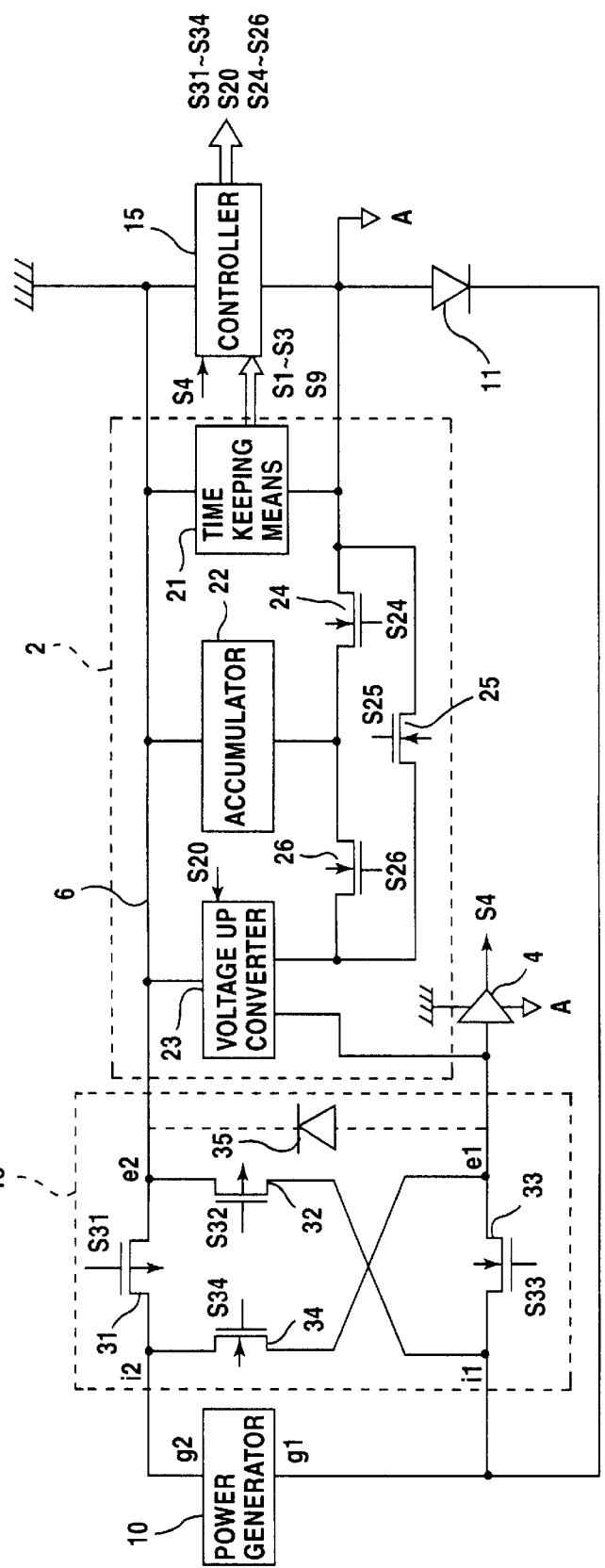
FIG. 4 is a block circuit diagram showing a system configuration of an electronic timepiece which is a second embodiment of the power generating system according to the present invention.
Figure 5:
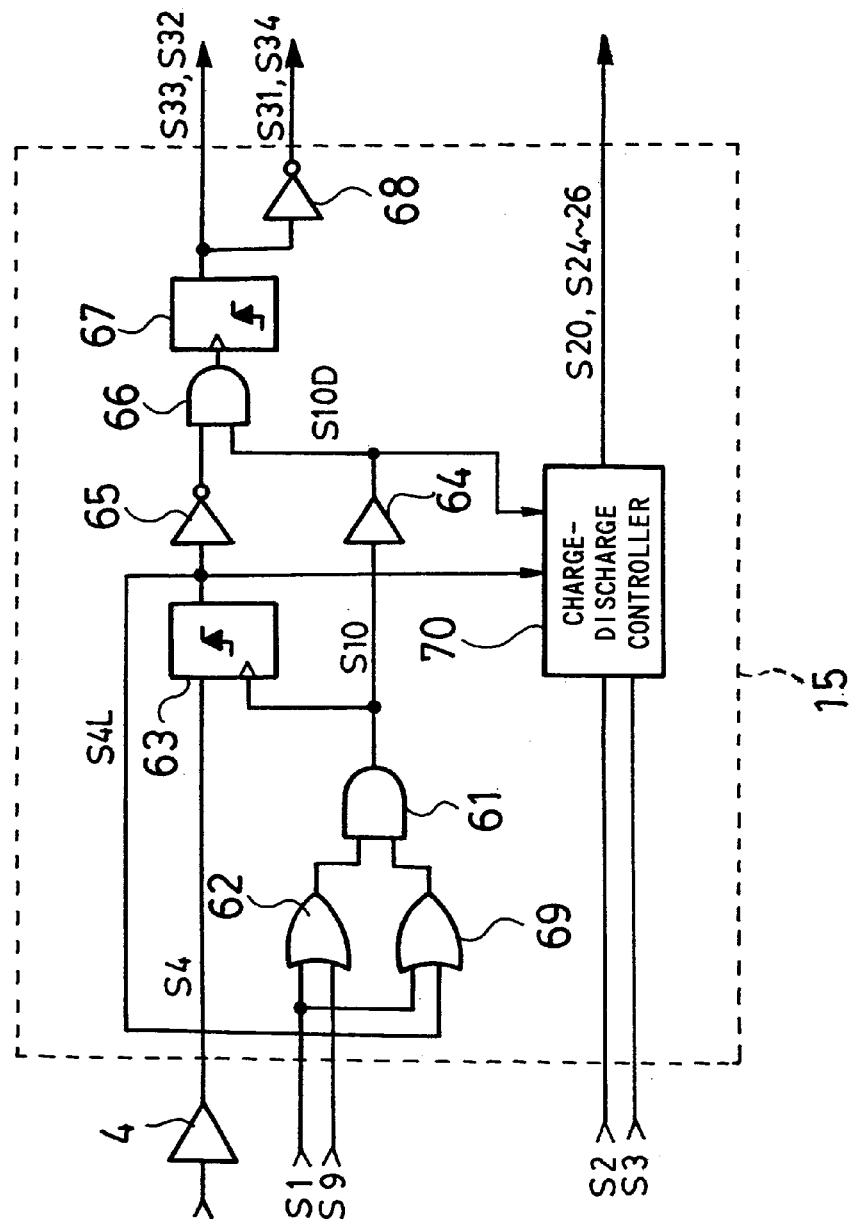
FIG. 5 is a circuit diagram showing a detailed circuit configuration of the controller in FIG. 4.
Figure 6:
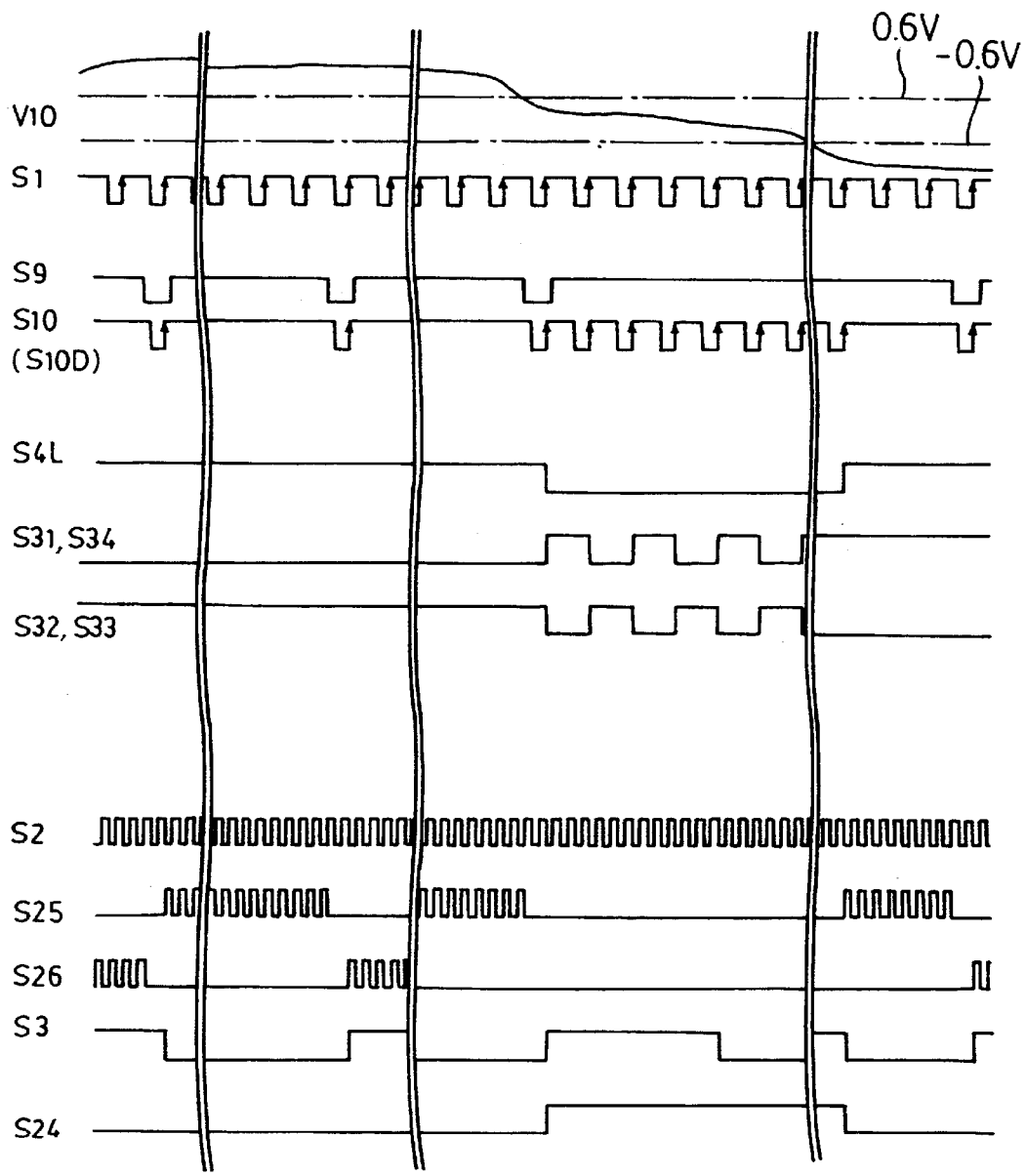
FIG. 6 is a timing chart showing waveforms of voltage and signal of each part to explain the operation of the electronic timepiece in FIG. 4.

Second Embodiment: FIG. 4 to FIG. 6

Next, the second embodiment of the power generating system according to the present invention will be explained with reference to FIG. 4 to FIG. 6.

FIG. 4 is a block circuit diagram showing a configuration of the electronic timepiece of the second embodiment of the power generating system according to the present invention. FIG. 5 is a circuit diagram showing a detailed circuit configuration of the controller, and FIG. 6 is a timing chart showing waveforms of voltage and signal of each principal portion to explain the operation of the electronic timepiece.

First, the system configuration of the electronic timepiece of the embodiment will be explained with reference to FIG. 4.

The electronic timepiece has nearly the same configuration as that in the electronic timepiece in the aforementioned first embodiment, but the configurations of a switch means 13 and a controller 15 are different from that of the switch means 3 and the controller 5 in the first embodiment, and the generated voltage measuring means 8 in the first embodiment is omitted.

Note that, the same numerals as in FIG. 1 are attached to a load means and a timekeeping means for convenience of explanation, though there is a slight difference in the timekeeping means 21 of the load means 2 from that in the first embodiment in such that it outputs a measure inhibiting clock S9 as an output signal, in addition to a measuring clock S1 (there is some difference in period), a voltage-up clock S2 and a distributing clock S3 which are similar to those in the first embodiment.

In the following explanation, these different points will be explained, and an explanation of the portions similar to those in the first embodiment will be omitted or simplified.

The switch means 13 shown in FIG. 4 connects the first to fourth switches 31 to 34 which consist of FETs, all are switching elements, between a pair of output terminals e1, e2 and a pair of input terminals i1, i2 connected to a pair of power generating terminals g1, g2 of the power generator 10 respectively. A short-circuit means 35 which consists of the Schottky barrier diode is connected between the output terminals e1 and e2 so as to be in the forward direction from the output terminals e1 to e2.

When voltage in the reverse direction to the voltage supplying direction to the load means 2 (positive voltage to the ground potential in this example) is outputted between the output terminals e1 and e2 of the switch means 13, the short-circuit means 35 is provided to short-circuit the voltage components.

The timekeeping means 21 slightly differs from the timekeeping means 21 in the first embodiment, and is configured to generate a measure inhibiting clock S9. The measure inhibiting clock S9 is a waveform signal which comes to a low level for 16 milliseconds (m sec) at a two-second period and a waveform signal which gets the trailing edge transition 8 milliseconds before the timing of the trailing edge transition of the measuring clock S1.

The measure inhibiting clock S9 is inputted to the controller 15 in a similar manner to the measuring clock S1, the voltage-up clock S2, and the distributing clock S3. Incidentally, a circuit to form the waveform of the measure inhibiting clock S9 will be omitted.

In addition, in this embodiment, there is a slight difference between the measurement process timing of the switch-output measuring means 4 and that in the first embodiment, the measuring clock S1 is made to have 8 milliseconds for the time to be in a low level at 16 Hz (period is 62.5 milliseconds). Incidentally, the measurement process will be described later.

Since the generated voltage measuring means 8 provided in the first embodiment is not provided in the second embodiment, the controller 15 in this embodiment is configured such that the generated voltage measuring signal S5 is not inputted.

Next, the configuration of the controller 15 will be explained with reference to FIG. 5.

The controller 15 comprises AND gates 61 and 66, OR gates 62 and 69, flip-flop circuits 63 and 67, a delay buffer 64, inverters 65 and 68 and a charge and discharge control circuit 70.

The AND gate 61 is a two-input AND gate and inputs the output of the OR gates 62 and 69, and outputs the measuring signal S10 from the output terminal.

The OR gate 62 is a two-input OR gate and inputs the measuring clock S1 and the measure inhibiting clock S9 outputted from the timekeeping means 21 and makes the output to be one of the inputs of the AND gate 61. The OR gate 69 is also a two-input OR gate and inputs the measuring clock S1 and the output signal S4L of the flip-flop circuit 63, and makes the output to be the other input of the AND gate 61.

The flip-flop circuit 63 is a data-type flip-flop circuit which holds and outputs the data-input value at the leading edge transition of the input clock, and the measuring signal S10 is inputted as an input clock, and the switch output measuring signal S4 is inputted as a data input.

To simplify the explanation, the flip-flop circuit used in the second embodiment is assumed to have a configuration in which all holding data are set at the time of the power supply.

The delay buffer 64 has a transfer delay of about the total sum of the response times of the flip-flop circuit 63 and the inverter 65, and outputs a signal which delayed the measuring signal S10 (for instance, about 50 microseconds) as a delay signal S10D. The delay signal S10D is inputted to one of the input terminals of the AND gate 66, and the charge and discharge control circuit 70.

The inverter 65 reverses the output signal of the flip-flop circuit 63 and inputs it to one of the input terminals of the AND gate 66. The AND gate 66 inputs the output signal of the inverter 65 and the delay signal S10D, and outputs the AND signal thereof.

The flip-flop circuit 67 is a toggle-type flip-flop circuit which outputs inverted value of the data values held at every leading edge transition of the input clock, and inputs the output signal of the AND gate 66 as an input clock. The flip-flop circuit 67 outputs the output signals as a third switch signal S33 and a second switch signal S32.

Since the flip-flop circuit 67 is a toggle-type circuit, switch operation of the switch means 13 is controlled to connect between the input and output terminals in the forward direction when the flip-flop circuit 67 holds the output in a high level, and conversely, when the flip-flop circuit 67 holds the output in a low level, it is controlled to connect between the input and output terminals in the reverse direction.

The inverter 68 inverts the second switch signal S32 and the third switch signal S33 outputted from the flip-flop circuit 67, and outputs as a first switch signal S31 and a fourth switch signal S34.

The charge and discharge control circuit 70 has the same configuration as the charge and discharge control circuit 70 shown in FIG. 2 in the first embodiment, and inputs the voltage-up clock S2 and the distributing clock S3 and outputs the voltage-up signal S20, the discharge signal S24, the first distributing signal S25 and the second distributing signal S26 to the load means 2.

It should be noted that in the second embodiment, instead of the output signal S6 of the second flip-flop circuit 52 which is inputted to the charge and discharge control circuit 7 in the first embodiment, the output signal S4L of the flip-flop circuit 63 is inputted, and the delay signal S10D is inputted instead of the output signal S1T of the multivibrator 60.

Next, an operation as a power generating system in the second embodiment will be explained with reference to FIG. 4 to FIG. 6.

The generated voltage V10 shown in FIG. 6 shows the potential difference between the power generating terminals g1 and g2 of the power generator 10 as a voltage waveform, and to make the explanation easy, the generated voltage V10 shows an open voltage under conditions in which no voltage drop occurs caused by the load current.

In an electronic timepiece of this power generating system, it is assumed for convenience of the explanation that sufficient power is stored for the timekeeping means 21 and the controller 15 to operate in the accumulator 22, and the magnitude of the capacity is sufficient enough for charging. Therefore, the function to protect excessive charge or the function to realize a start-up operation from suspension of the operation of the power generating system are supposed not to be provided, though they are shown in the first embodiment, and the terminal voltage of the accumulator 22 is supposed to have a constant value of 1.2V.

First, the case where the power generator 10 is generating electric power at voltage of more than 1.0V in the forward direction will be explained.

In this case, since the timekeeping means 21 and the controller 15 in the electronic timepiece are provided with sufficient electric power as required, the measuring clock S1, the distributing clock S2, the voltage-up clock S3 and the measure inhibiting clock S9 are outputted in designated waveforms from the timekeeping means 21.

For convenience of explanation, it is assumed that output signal S4L of the flip-flop circuit 63 shown in FIG. 5 is in a high level, and the flip-flop circuit 67 keeps the output signal in a high level. When the flip-flop circuit 67 keeps the output signal in a high level, the second and third switch signals S32 and S33 come to a high level, and S31 and S34 are in a low level so that the switch means 13 takes a state to connect between the input and output terminals in the forward direction.

At this time, since the switch-output measuring means 4 inputs the generated voltage of the power generator 10 in the forward direction, it outputs the switch output measuring signal S4 in a high level.

Further, the output signal S4L of the flip-flop circuit 63 is in a high level, the OR gate 69 always outputs a high level signal.

Yet further, since the OR gate 62 outputs a signal of the logical addition of the measuring clock S1 and the measure inhibiting clock S9, the AND gate 61 outputs the signal of the logical addition as a measuring signal S10 as it is. The measuring signal S10 at this time becomes a signal having a waveform which changes the period of 62.5 milliseconds, the original period of the measuring clock S1, to a 2 second period, which is a period of the measure inhibiting clock S9.

Through the process, the period of measuring operation by the switch-output measuring means 4 is changed, and the flip-flop circuit 63 is to capture the switch output measuring signal S4 at a 2 second period. Here, since the power generator 10 generates electric power at a voltage of more than 1.0V, the flip-flop circuit 63 captures a high level switch output measuring signal S4 to continuously output a high level output signal S4L.

At this time, the AND gate 66 inputs an inverted signal of the high level output signal S4L of the flip-flop circuit 63, thereby the output signal is kept in a low level. Therefore, since after that the signal of the flip-flop circuit 67 does not change, the switch means 13 maintains the connection relationship between the input and output terminals in the forward direction.

During this time, in the charge and discharge control circuit 70, the discharge signal S24 inverts the output signal S4L of the flip-flop circuit 63 inputted in a high level to come to a low level, thereby the discharge switch 24 shown in FIG. 4 comes to an off state. On the other hand, the voltage-up signal S20 becomes active and the voltage-up operation of the voltage-up converter 23 is continued.

Next, the case when circumstances of the electronic timepiece change, and the generated voltage of the power generator 10 becomes about 0.4V in the forward direction, will be explained.

The switch means 13 has been in a state to connect between the input and output terminals in the forward direction in these operations. When the generated voltage of the power generator 10 becomes about 0.4V in the forward direction, voltage of −0.4V to the ground potential is inputted to the switch-output measuring means 4, which is compared with the threshold value of −0.6V. Finding the inputted voltage to be more than the threshold value, a switch output measuring signal S4 in a low level is outputted.

Since the output signal S4L of the flip-flop circuit 63 in FIG. 5 has been in a high level until now, the measuring signal S10 becomes active at intervals of two seconds, but at this time, when the flip-flop circuit 63 captures the switch output measuring signal S4 in a low level, the output signal S4L changes to a low level.

Then the output signal of the inverter 65 changes to a high level, the AND gate 66 which inputs the output signal of the inverter 65 changed to a high level and the delay signal S10D in which the leading edge transition appears later than the measuring signal S10, receives the leading edge transition of the delay signal S10D to change the output signal from a low level to a high level.

Through this, the flip-flop circuit 67 inverts the output signal in a high level into a low level by the leading edge transition of the output signal of the AND gate 66. Then, all levels of the switch signals from the first to fourth switch signals S31 to S34 are inverted, thereby the switch means 13 in FIG. 4 allows the second and fourth switch 32 and 34 to be in an on state and the first and third switches 31 and 32 to be in an off state so that a state to connect between the input and output terminals in the reverse direction is obtained. Accordingly, the polarity of the generated voltage of the power generator 10 is reversed by the switch means 13 to be outputted.

Receiving the output signal S4L of the flip-flop circuit 63, the discharge signal S24 comes to a high level to make the discharge switch 24 in an on state. Accordingly,, the time-keeping means 21 receives power supply from the accumulator 22 through the discharge switch 24 so as to be driven with stability. On the other hand, since the voltage-up signal S20 comes to a low level, voltage-up operation of the voltage-up converter 23 is suspended.

Next, the case where the generated voltage of the power generator 10 is less than 0.6V in the absolute value will be described.

In such a circumstance, in either direction of forward or reverse, or in any connection state the switch means 13 may be, a voltage less than −0.6V to the ground potential can never be inputted to the switch-output measuring means 4. Therefore, while the generated voltage is within 0.6V in the absolute value, the switch output measuring signal S4 is outputted staying in a low level.

Though the output signal S4L of the flip-flop circuit 63 has been in a low level until this time, the OR gate 69 and the AND gate 61 output the measuring clock S1 as it is during the period, so that the measuring signal S10 becomes active at high speed at a period of 62.5 milliseconds. The flip-flop circuit 63 captures the switch output measuring signal S4 at this period, but the flip-flop circuit 63 keeps the output signal S4L in a low level while the switch output measuring signal S4 is in a low level.

At this time, since the AND gate 66 outputs the delay signal S10D as it is, which delays the measuring signal S10 as it is, the flip-flop circuit 67 repeats the toggle operation of the output signal at a period of 62.5 milliseconds. Then, the switch means 13 repeats the connection between the input and output terminals in the forward direction and in the reverse direction alternatively.

Thus, when generated voltage of the power generator 10 is not sufficient for any direction of forward or reverse direction, the switch means 13 switches the connection state at a period of 62.5 milliseconds, and reverses the polarity of the output voltage, so that the polarity with which the power generator 10 starts the power generation can be distinguished quickly by the switch-output measuring means 4. Note that the discharge switch 24 stays in an on state, the voltage-up signal S20 comes to a low level, and the voltage-up operation of the voltage-up converter 23 stays suspended, during this time.

Here, the switch means 13 switches the connection direction between the input and output terminals in the forward direction and in the reverse direction, but in the embodiment, a short-circuit means 35 is provided between the output terminals e1 and e2 of the switch means 13, and when a voltage component reverse of the voltage supplying direction to a load is created between the output terminals e1 and e2, the short-circuit means 35 short-circuits between the output terminals e1 and e2. Accordingly, whichever value the generated voltage of the power generator 10 may have, voltage in the reverse direction exceeding the ground potential is never applied to the load means 2 side, and the integrated circuit including the load means 2 can be protected against breakage.

Next, the case where the generated voltage of the power generator 10 generates power at 1.0V in the reverse direction will be explained.

In the above-described process, the switch means 13 takes a state to connect between the input and output terminals in the forward direction or in the reverse direction, and when the power generator 10 generates voltage of 1.0V in the reverse direction while the switch means 13 is in the reverse connection state, the switch means 13 outputs the voltage in reverse polarity, and voltage of −1.0V to the ground potential is inputted to the switch-output measuring means 4, thereby the switch output measuring signal S4 changes from a low level to a high level. And the flip-flop circuit 63 in FIG. 5 captures the switch output measuring signal S4 in the high level to make the output signal S4L in a high level.

When the output signal S4L of the flip-flop circuit 63 comes to the high level, the output signal of the AND gate 66 is in a low level to stop the toggle operation of the flip-flop circuit 67. As a result, the switch means 13 keeps a state to connect between the input and output terminals in the reverse direction, so as to reverse the polarity of the generated voltage generated in the reverse direction to the forward direction and to output to the load means 2. Accordingly, electric power by the generated voltage in the reverse direction can be efficiently utilized by means of the load means 2 so as to perform the voltage-up operation by the voltage-up converter 23 to charge the accumulator 22 or to use for the operation of the timekeeping means 21 and the controller 15.

As is clear by the aforementioned explanation of the operations, in this embodiment, when generated voltage by the power generator 10 is in the forward direction and has sufficient voltage, the switch means 13 is made in a connection state in the forward direction, while the generated voltage is in the reverse direction with sufficient voltage, the switch means 13 is made in a connection state in the reverse direction, to output the generated voltage by reversing the polarity. During this time, by operating the voltage-up converter 23, the electric power is to be used for driving the load means.

In addition, when generated voltage of the power generator 10 is very low in both directions of forward and reverse, the connection state of the switch means 13 is changed in the forward direction or in the reverse direction alternatively so as to continue to distinguish the polarity with which the power generator 10 starts power generation fully, and the generated voltage measuring means 8 provided in the first embodiment is omitted.

SCOPE OF APPLICATION AND EFFECT OF INVENTION

In the first and second embodiments explained above, examples to apply the power generating system of the present invention to an electronic timepiece have been described, but the power generating system according to the present invention is not limited to these examples and it is a matter of course that it is similarly applicable as an electric source system such as various portable devices and compact size electronic devices.

Additionally, when the power generator used in the power generating system is a thermoelectric power generating device, the reverse of the polarity in the generated voltage is apt to be created, accordingly the above explanation is made mainly in an assumption of the above-described situation, but even in other power generators, it is all effective, provided that the power generator which can change the polarity of the power generation according to the circumstances it is used.

According to the power generating system of the present invention, even in a power generating system having a power generator which changes the polarity of the generated voltage in the forward or reverse direction, by switching the connection state of the switch means according to the polarity change of the generated voltage, the polarity of the output voltage can be converted to a predetermined state required for the load means at a very small loss.

Accordingly, it becomes possible to utilize with high efficiency a bilateral generated voltage component by means of a power generator such as a thermoelectric power generator which could not be efficiently utilized in the power generating system using a conventional full-wave rectifier.

What is claimed is:

1. A power generating system, comprising:
   a power generator for outputting generated voltage by converting energy from outside into electric energy;
   a switch means which consists of plural switching elements, and having a pair of output terminals respectively connectable to a pair of power generating terminals which output the generated voltage of said power generator;
   a switch-output measuring means for measuring the output voltage of said switch means;
   a load means which is connected to said pair of output terminals of said switch means, and being applied with the output voltage of said switch means to operate by electric power thereof; and
   a controller which controls the plurality of switching elements of said switch means in response to the measured result of said switch-output measuring means, thereby controlling connection relationship between said pair of power generating terminals of said power generator and said pair of output terminals of said switch means.

2. The power generating system according to claim 1, wherein
   said switch-output measuring means performs the measuring operation intermittently at a predetermined period of time.

3. The power generating system according to claim 2, wherein
   said controller includes a means for controlling so as to change the period of said measuring operation of said switch-output measuring means according to the measured result of said switch-output measuring means.

4. The power generating system according to claim 1, wherein
   said controller includes a means to control said switch means to isolate said power generator and said load means or to make said load means in a low load condition during the measuring operation of said switch-output measuring means.

5. The power generating system according to claim 1, wherein
   said controller includes a means to control said switch means so as to short-circuit between said pair of power generating terminals of said power generator when said load means does not require power supply by said power generator.

6. The power generating system according to claim 1, wherein
   an initializing means is provided to apply the generated voltage of said power generator to said controller without using said load means when said controller is in an operation-stop state and when said power generator starts power generation from the operation-stop state.

7. The power generating system according to claim 1, wherein
   a short-circuit means is provided to short-circuit a voltage component in the reverse direction of the voltage supplying direction to said load means between said pair of output terminals of said switch means.

8. The power generating system according to claim 1, wherein
   said controller is to control the connection relationship between said pair of power generating terminals of said power generator and said pair of output terminals of said switch means so that said switch means applies the generated voltage of said power generator reversing the polarity to said load means when the output voltage of said switch means is below a predetermined value.

9. The power generating system according to claim 1, wherein
   said controller includes a means for controlling said switch means so as to equalize one of said pair of power generating terminals of said power generator to the ground potential of the switch-output measuring means and to connect the other power generating terminal to the input terminal of said switch-output measuring means, during measuring operation of said switch-output measuring means.

10. The power generating system according to claim 1, wherein
    said controller includes a means for controlling said switch means to isolate said power generator from said load means, when the output voltage of said switch means measured by said switch-output measuring means is less than a predetermined value.

11. A power generating system, comprising:
    a power generator for outputting generated voltage by converting energy from outside into electric energy;
    a generated voltage measuring means for measuring generated voltage of said power generator;
    a switch means which consists of plural switching elements, and having a pair of output terminals respectively connectable to a pair of power generating terminals which output the generated voltage of said power generator;
    a switch-output measuring means for measuring the output voltage of said switch means;
    a load means which is connected to said pair of output terminal of said switch means, and being applied with the output voltage of said switch means to operate by electric power thereof; and a controller which controls the plurality of switching elements of said switch means in response to the measured result of said generated voltage measuring means and said switch-output measuring means, thereby controlling the connection relationship between said pair of power generating terminals of said power generator and said pair of output terminals of said switch means.

12. The power generating system according to claim 11, wherein said switch-output measuring means performs the measuring operation intermittently at a predetermined period of time.

13. The power generating system according to claim 11, wherein said controller includes a means to control said switch means to isolate said power generator from said load means or to make said load means in a low load condition during the measuring operation of said switch-output measuring means.

14. The power generating system according to claim 11, wherein said controller includes a means to control said switch means to isolate said power generator from said load means or to make said load means in a low load condition during the measuring operation of said generated voltage measuring means.

15. The power generating system according to claim 11, wherein said controller includes a means to control said switch means so as to short-circuit between said pair of power generating terminals of said power generator when said load means does not require power supply by said power generator.

16. The power generating system according to claim 11, wherein an initializing means is provided to apply the generated voltage of said power generator to said controller without using said load means when said controller is in an operation-stop state and when said power generator starts power generation from the operation-stop state.

17. The power generating system according to claim 11, wherein a short-circuit means is provided to short-circuit a voltage component in the reverse direction of the voltage supplying direction to said load means between said pair of output terminals of said switch means.

18. The power generating system according to claim 11, wherein said controller includes a means for controlling said switch means so as to equalize one of said pair of power generating terminals of said power generator to the ground potential of the switch-output measuring means and to connect the other power generating terminal to the input terminal of said switch-output measuring means, during measuring operation of said switch-output measuring means.

19. The power generating system according to claim 12, wherein said controller includes a means for controlling so as to change the period of said measuring operation of the switch-output measuring means according to the measured result of said switch-output measuring means.

20. The power generating system according to claim 11, wherein said controller is a means for controlling said switch means so as to reverse the connection relationship between said pair of power generating terminals of said power generator and said pair of output terminals of said switch means according to whether the generated voltage of said power generator measured by said generated voltage measuring means is more than a predetermined value or less than the predetermined value.

21. The power generating system according to claim 11, wherein said controller includes a means for controlling said switch means so that one of said pair of power generating terminals of said power generator is equalized with the ground potential of said generated voltage measuring means, and said generated voltage measuring means measures the voltage of the other power generating terminal during measuring operation of said generated voltage measuring means.

22. The power generating system according to claim 11, wherein said controller includes a means for controlling said switch means to isolate said power generator from said load means, when the output voltage of said switch means measured by said switch-output measuring means is less than a predetermined value.

* * * * *